Nov. 12, 1935.  W. DIETERLE ET AL  2,020,636
SENSITIZING OF SILVER HALIDE EMULSIONS
Filed July 11, 1932
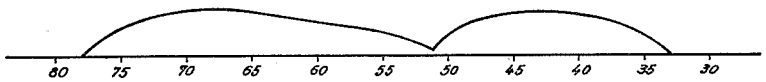
Silver bromide emulsion containing about 4% of silver iodide sensitized with 1·1'-dimethyl- 4·4' diethylamino -3·3'-bisdimethylindocarbocyanine perchlorate.
Inventors:
Walter Dieterle,
Herman Dürr,
By Attorney
Philip S. Hopkins.

Patented Nov. 12, 1935

2,020,636

UNITED STATES PATENT OFFICE 2,020,636

SENSITIZING OF SILVER HALIDE EMULSIONS

Walter Dieterle, Dessau in Anhalt, Germany, and Hermann Dürr, Binghamton, N. Y., assignors to Agfa Ansco Corporation, Binghamton, N. Y., a corporation of New York Application July 11, 1932, Serial No. 621,996
In Germany July 11, 1931

2 Claims. (Cl. 95—7)

Our present invention relates to sensitizing of photographic emulsions.

One of its objects is to provide such an emulsion the sensitiveness of which is raised over the range of wave lengths to which the emulsion is normally sensitive. Further objects will be seen from the detailed specification following hereafter, reference being made to the accompanying drawing representing a spectrogram of a silver halide emulsion sensitized with 1.1'-dimethyl-4.4'-diethylamino-3.3'-bisdimethylindocarbocyanine-perchlorate.

Our invention is based on the observation that the dialkyl- and the diarylaminoindocarbocyanines are sensitizers to red and dark red of an intensity hitherto unknown. Their sensitizing action extends from about 545 to 750 $\mu\mu$ with a maximum at about 695 to 700 $\mu\mu$. The layers sensitized with these dyestuffs allow of photography of far distant objects behind strong red filters, the absorption of which reaches 600 $\mu\mu$, while exposing a very short time. When exposing a commercial high speed silver bromide gelatin emulsion sensitized with these dyestuffs behind a red filter of the kind described while the sun shines, the focal aperture being $f/6.3$, exposure as short as 1/150 second will be sufficient. The layers sensitized according to this invention are, therefore, about five times as sensitive as are the hitherto known red sensitive layers, and are well suited for use in taking pictures from the air.

The sensitizing dyestuffs according to this invention have the following formula:

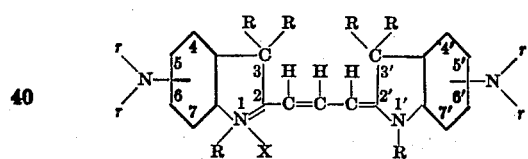

R=alkyl,
r=alkyl,
X=halide, paratoluenesulfonate, alkylosulfate, perchlorate.

The amino groups having the radicals $r$ and $r'$ may be introduced in the positions 4, 5, 6 or 7 and 4', 5', 6', 7' correspondingly, the 4 and 4' positions being preferred.

The following example serves to illustrate the invention.

The sensitizing dye 1.1'-dimethyl-4.4'-bisdiethylamino-3.3'-bisdimethylindocarbocyanine-iodide corresponding to the following formula

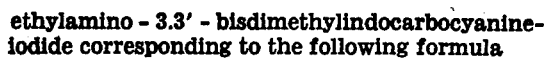

is obtainable as follows:

20 grams of the starting material 2-methylketol corresponding to the formula:

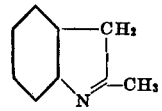

are heated with 34 grams of methyliodide and 15 cc. of methanol in a sealed tube for about 42 hours to about 105° C. The reaction mixture is dissolved in methanol and precipitated by ethyl ether.

100 grams of the formed tetramethylindole-iodide corresponding to the formula

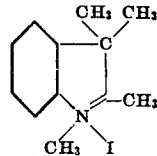

are dissolved in about 500 cc. of water. After the addition of caustic soda the yellow base is extracted by means of ethyl ether and the ether is distilled off. The residue is dissolved in about 250 cc. of concentrated sulfuric acid while cooling and nitrated with a mixture of 23 grams of fuming nitric acid in 60 cc. of concentrated sulfuric acid while keeping the temperature at about 0° C. This operation lasts about 45 minutes. The reaction mixture is mixed with water while cooling and caustic soda is added until the reaction is alkaline while further cooling.

50 grams of the nitrated product thus obtained corresponding to the formula

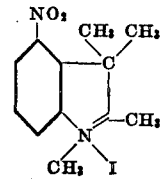

are mixed with a small quantity of warmed alcohol and a mixture of 150 cc. of concentrated hydrochloric acid with 50 cc. of H₂O. While well stirring 45 grams of finely divided tin are added. Hereon the mixture is heated for about 1 hour on the water bath. After filtration the solution is made alkaline and the precipitate thoroughly extracted with ether. After evaporating the ether the amino compound corresponding to the formula

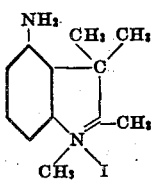

is obtained in the form of greenish white crystals.

10 grams of the amino product are heated with 17 grams of ethyl-iodide and 10 cc. of alcohol in a sealed tube for 20 hours to 105° C. The diethylamino compound thus produced is recrystallized from alcohol with aid of acetone and ether.

5 grams of the diethylamino-N-methyl-iodide thus obtained corresponding to the formula

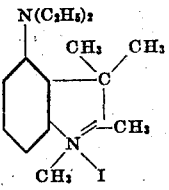

are heated with 20 cc. of pyridine and 5 cc. of ethyl-ortho-formate for 3 hours to about 120° C. under reflux. The hot blues solution is mixed with a large quantity of a 5 per cent solution of potassium iodide. After some time coarse-grained green crystals separate which are recrystallized several times from a small quantity of alcohol.

A silver bromide emulsion containing 4 per cent of silver iodide after sensitizing with this dye acquires a sensibility to wave lengths of about 545 to 750 μμ with a maximum at about 695 μμ. The spectrogram of this emulsion is shown in the accompanying drawing.

According to the same method other amino-substituted 3.3' - bisdimethylindocarbocyanines may be obtained.

The dyes are obtainable according to the desired solubility in form of the bromide, iodide, perchlorate or the like, and are used in a quantity such as is usual for the known sensitizing dyes. This quantity may vary from about 1 to 5 milligrams per 1 kilo of emulsion ready for being cast, which contains about 9 per cent of gelatine and 4.5 per cent of silver halide, the rest being water. However, the invention is not limited to the quantities just indicated, and the most suitable amount can in each case be found by a few comparative experiments. The dyes may be added to the emulsion in the form of solutions; suitable solvents are the alcohols, for instance, methyl or ethyl alcohol, which may be used in anhydrous state or diluted with water. The dyes may be applied to the emulsion during any stage of its production, but are preferably added to the finished emulsion before it is cast. For example, to 1 kilo of a liquid emulsion ready for being cast there are added 3 milligrams of 1.1'-dimethyl - 4.4' - bisdiethylamino - 3.3' - bisdimethyl-indo-carbocyanine iodide dissolved in 2 cc. of alcohol having a temperature of about 40° C., while thoroughly stirring. After the added solution of the sensitizer has been uniformly distributed in the liquid emulsion, stirring is discontinued and the masse is allowed to stand. After a short time, say 5 minutes, it may be cast.

The dyes may likewise be incorporated in the emulsion by coating the cast, but not dried, emulsion layer with a solution of the sensitizer in, for instance, aqueous or non-aqueous methyl alcohol or ethyl alcohol, applied by means of a coating roller. The concentration of the solution depends upon the speed of coating; for example, when the speed of coating amounts to 20 cm. per second, a suitable solution may consist of about 1 mg. of the sensitizer dissolved in 100 cc. of aqueous methyl alcohol of 50 per cent strength. Another method of incorporating the sensitizer in the emulsion consists in bathing the finished photographic material in a solution of the dye. Such a treatment may be as follows:—
The photographic material to be sensitized is bathed in a solution containing 1 milligram of 1.1' - dimethyl - 4.4' - bisdiethylamino - 3.3' - bis-dimethyl-indocarbocyanine iodide in 250 parts of an aqueous solution of methanol of 50 per cent strength for about 5 minutes. The material is then dried, whereupon it is ready for use.

What we claim is:

1. A photographic material comprising a silver halide emulsion containing an indocarbocyanine corresponding probably to the general formula

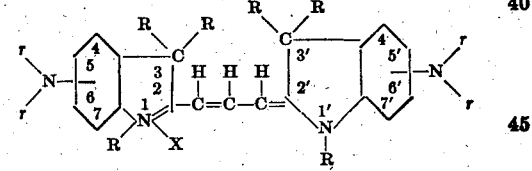

R=alkyl,
r=alkyl,
X=an anion capable of precipitating the dye.

2. A photographic material comprising a silver halide emulsion containing 1.1'-dimethyl-4.4'-diethylamino-3.3'-bisdimethylindocarbocyanine-bromide corresponding probably to the formula:

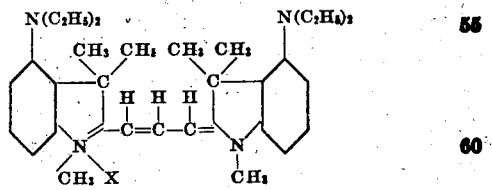

and being sensitized for a range of wave lengths from about 545 μμ to about 750 μμ with a maximum at about 695 μμ.

WALTER DIETERLE.
HERMANN DÜRR.